United States Patent Office 2,759,939
Patented Aug. 21, 1956

2,759,939

DYESTUFFS OF THE AZA(3)-BENZANTHRONE SERIES AND THE PREPARATION THEREOF

Paul Bucheler and Albin Peter, Binningen, Switzerland, assignors to Sandoz A. G., Basel, Switzerland, a Swiss firm No Drawing. Application May 4, 1953,
Serial No. 352,966

Claims priority, application Switzerland May 8, 1952

12 Claims. (Cl. 260—272)

The present invention relates to dyestuffs of the aza(3)-benzanthrone series and to the preparation thereof.

This application is a continuation-in-part of copending application Serial No. 298,182, filed July 10, 1952, disclosing inter alia compounds of the anthrapyridine series which correspond to the formula

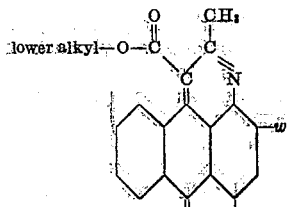

wherein $v$ stand for chlorine, bromine, nitro or methoxy, and $w$ stands for hydrogen, chlorine, bromine, lower alkyl or the sulfonic acid group.

These compounds can be prepared by condensing primary amines of the anthraquinone series, corresponding to the formula

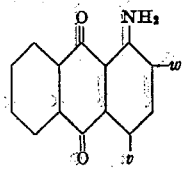

wherein $v$ and $w$ have the aforementioned significances, with lower alkyl esters of acetoacetic acid under acid conditions in an organic solvent and while distilling off the by-products formed during the reaction.

The present invention is concerned with valuable dyestuffs of the aza(3)-benzanthrone series which correspond to the formula

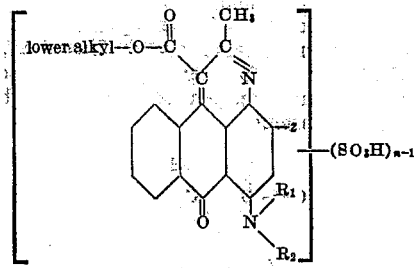

wherein $z$ stands for hydrogen, chlorine, bromine, methyl, lower alkoxy, mononuclear aryloxy or $SO_3H$, $R_1$ stands for hydrogen, alkyl or acyl, $R_2$ stands for hydrogen, alkyl, cycloalkyl, aralkyl, aryl or the residue of an azo compound, and $n$ is one of the integers 1, 2, 3 and 4.

The new dyestuffs of the aza(3)-benzanthrone series which correspond to the above-mentioned formula and wherein $z$ stands for hydrogen, chlorine, bromine, methyl or $SO_3H$, can be obtained by condensing, in the presence of an acid binding agent, aza(3)benzanthrones which correspond to the formula

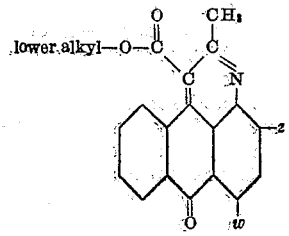

wherein $z$ stands for hydrogen, chlorine, bromine, methyl and $SO_3H$, and $w$ stands for chlorine, bromine or nitro, with ammonia or substituted ammonia derivatives possessing at least one replaceable hydrogen atom linked to the nitrogen atom, and—if desired—by treating the thus-obtained products with sulfonating agents and/or—when the radicals of the substituted ammonia derivatives are saponifiable—with saponifying agents.

In the condensation, the negative substituent in the 6-position of the aza(3)-benzanthrone is replaced by an amino radical. The negatively substituted aza(3)-benzanthrones which are employed as starting materials for the present invention can be prepared according to the process of the aforesaid copending application Serial No. 298,182. Thus, for example, 1-carbethoxy-2-methyl-6-bromo-aza-(3)-benzanthrone-4-sulfonic acid may be prepared by condensing 1-amino-4-bromoanthraquinone-2-sulfonic acid with acetoacetic acid ethyl ester under acid conditions in an organic solvent, such as benzene or the like. Also those of the new dyestuffs of the aza(3)-benzanthrone series which correspond to the above-mentioned formula, but wherein $z$ stands for lower alkoxy and mononuclear aryloxy, are obtained according to the process of copending application Ser. No. 298,182.

Suitable substitution products of ammonia for use in the condensation according to the present invention comprise for example acid amides such as acetamide, 1-methylbenzene-4-sulfonic acid amide, etc., secondary amines such as methylaminobenzene, etc., and especially primary amines, which may be of the aliphatic, cycloaliphatic, aromatic or heterocyclic series. Thus, use may be made inter alia of amylamine, cyclohexylamine, benzylamine, aminobenzene, the amino-methylbenzenes, the aminomethoxybenzenes, the amino-chlorobenzenes, 1-amino-4-nitrobenzene, 1-aminobenzene-4-sulfonic acid, 2-amino-1,-1' - diphenyl, 4-amino-1,1'-diphenyl, 4,4'-diamino-1,1'-diphenyl, 4,4'-diamino-1,1'-diphenyl sulfone, 4,4'-diamino-1,1'-diphenyl-2,2'-sulfone, 4-amino-1,1' - azobenzene, the more complicated azo dyestuffs, 4-aminopyridine, etc., to name a few of the more representative substitution products.

In the condensation, the components are heated together as such or in a solvent such as water, dioxane, ethylalcohol, butyl alcohol, cyclohexanol, phenol, methoxy-benzene, 1,2,3,4-tetrahydronaphthalene, chlorobenzene, nitrobenzene, dimethylaminobenzene, and with the addition of an acid-binding agent, such for example as sodium acetate, potassium acetate, sodium carbonate, potassium carbonate or the like. The addition of copper or copper salts, which is conventional and necessary in similar condensations in the anthraquinone series, is surprisingly unnecessary in the condensation according to the present invention and in some cases may even be prejudicial. In view of the ready course of the reactions, low temperatures—for example 40° to 130°—are sufficient, even with such weakly basic amines as 1-amino-4-nitrobenzene or 4,4'-diamino-1,1'-diphenylsulfone, the condensation of which with compounds of the anthraquinone series is exceedingly troublesome.

The condensation products, according to the invention, are isolated from the reaction mixture by salting out from the aqueous solution or by dilution of the ingredients in organic solvents with alcohol, followed by filtering, washing and drying. The products are yellow to red powders which dissolve with like colorotion in water in so far as they contain a sulfonic acid group, and are otherwise readily to difficultly soluble in organic solvents, the resulting solutions being similarly colored.

Those products which contain no sulfonic acid groups are useful as pigments for coloring lacquers, printing pastes, paper, etc., and for coloring synthetic fibers in the spinning process. They can be converted into water-soluble sulfonic acids by treatment with fuming sulfuric acid. The water-soluble sulfonated products are suitable for dyeing fibers of all types, e. g. cotton, wool, silk, synthetic polyamide fibers, polyvinyl fibers, etc.

The following examples set forth representative presently-preferred embodiments of the invention; these examples are intended to be illustrative and not limitative of the invention. The parts and percentages are by weight; the temperatures are in degrees centigrade.

EXAMPLE 1

24 parts of 1-carbethoxy-2-methyl-6-bromo-aza(3)-benzanthrone-4-sulfonic acid, 100 parts of water and 150 parts of aqueous ammonium hydroxide solution of 30% strength are gradually heated to 75° in the course of 6 hours while stirring, and then maintained for 2 more hours at this temperature. Thereupon 10 parts of sodium chloride are added to the reaction mass. The latter is allowed to cool to 50°, and the formed precipitate separated by suction filtration, washed with aqueous sodium chloride solution of 5% strength until the wash water is only weakly colored, and dried. The thus-prepared product is an orange-yellow powder which corresponds to the formula

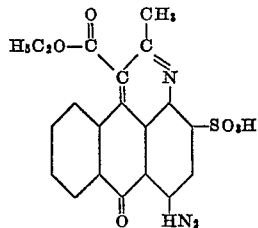

and dissolves with yellow coloration in water. The resultant solution exhibits a yellow-green fluorescence. The dyestuff thus obtained dyes wool and Dynel yellow.

EXAMPLE 2

20 parts of 1-carbethoxy-2,4-dimethyl-6-bromo-aza(3)-benzanthrone, 10 parts of 1-methylbenzene-4-sulfonic acid amide and 10 parts of anhydrous potassium acetate are heated in 50 parts of hydroxybenzene to 110°, with stirring, until a test specimen—taken up in ethyl alcohol, filtered and washed with ethyl alcohol and water—is halogen-free. Thereupon the reaction mass is allowed to cool to 70°, 150 parts of ethyl alcohol are added dropwise in the course of a half hour and the resultant precipitate which corresponds to the formula

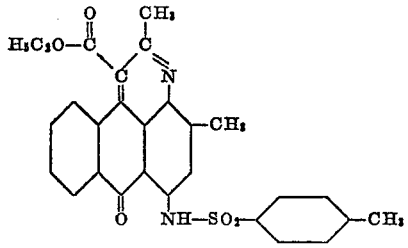

is filtered off with suction at 55°. The precipitate is washed with ethyl alcohol and hot water and dried. 12 parts of the thus-obtained orange-yellow product are added, at 25–30° and with stirring, to 25 parts of sulfuric acid (92% strength), and maintained at 30–35° for 3 hours. Then 8 parts of water are added dropwise to the solution at 25–30°; the resultant precipitate is filtered off and washed with sulfuric acid (70% strength). The acid filter cake is then stirred into a mixture of 250 parts of water and 30 parts of aqueous sodium hydroxide solution (30% strength), and stirring is continued for 4 hours. The produced dyestuff is suction-filtered off, washed neutral with water, and dried. It is thus obtained as a citron-yellow powder which corresponds to the formula

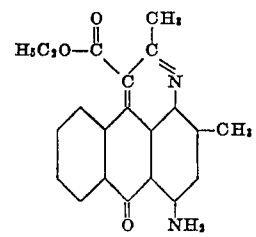

and dissolves in benzene with yellow coloration and with strong yellow-green fluorescence.

EXAMPLE 3

24 parts of 1-carbethoxy-2-methyl-6-bromo-aza(3)-benzanthrone-4-sulfonic acid, 10 parts of sodium carbonate, 6 parts of benzoic acid amide and 200 parts of water are stirred together for 3 hours at 95°. The solution is then gradually run into 500 parts of water and 25 parts of hydrochloric acid (30% strength) at 20° while stirring, and the resultant precipitate is suction-filtered off, washed neutral with aqueous sodium chloride solution (10% strength) and dried. The obtained orange-brown powder, corresponding to the formula

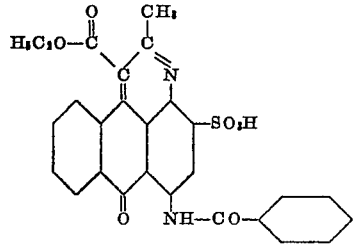

dissolves with yellow-orange coloration in water.

EXAMPLE 4

62 parts of 1 - carbethoxy - 2,4 - dimethyl - 6-bromo - aza(3)-benzanthrone, 30 parts of anhydrous potassium acetate, 15 parts of amylamine and 300 parts of n-butyl alcohol are stirred together at 118° until a test specimen—taken up in water, filtered and washed with hot water—is completely soluble in cold ethyl alcohol. The reaction mass is thereupon allowed to cool, and the resultant precipitate is suction-filtered off, washed with ethyl alcohol (40% strength) and with hot water and dried. An orange-red powder is obtained which corresponds to the formula

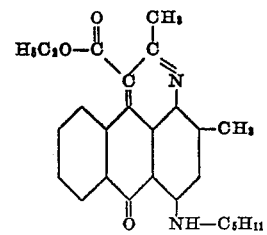

and dissolves in organic solvents, such as alcohol, benzene, ethyl acetate and benzine, with yellow coloration and with strong yellowish fluorescence.

EXAMPLE 5

10 parts of 1 - carbethoxy - 2 - methyl - 4,6-dichloro-azo(3)-benzanthrone, 3 parts of benzylamine, 5 parts of anhydrous potassium acetate and 100 parts of n-butyl alcohol are heated together to 110° for 6 hours, while stirring. After cooling of the reaction mass to 20°, the separated crystalline precipitate is filtered off with suction, washed with ethyl alcohol and then with hot water and dried. The so-obtained brown-yellow prisms of the formula

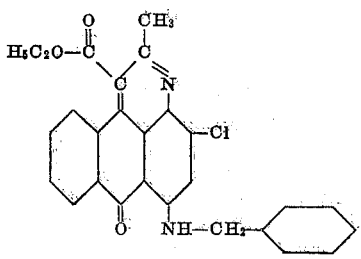

melt at 192–194° and dissolve in benzene with yellow coloration and yellow-green fluorescence.

EXAMPLE 6

24 parts of 1-carbethoxy-2-methyl-6-bromo-aza(3)-benzanthrone-4-sulfonic acid, 12 parts of sodium carbonate, 5.3 parts of cyclohexylamine and 250 parts of water are stirred together at 90–95° for 7 hours. A precipitate forms. This precipitate is filtered off with suction at room temperature (20–30°), washed with aqueous sodium chloride solution (2% strength) until the filtrate (wash water) is only weakly colored, and dried. The thus-obtained yellow powder corresponds to the formula

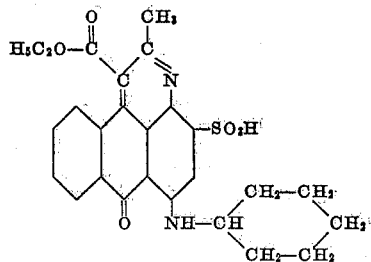

and dissolves with yellow coloration in water. It dyes wool orange-yellow.

EXAMPLE 7

24 parts of 1-carbethoxy-2-methyl-6-bromo-aza(3)-benzanthrone-4-sulfonic acid, 6 parts of 2-aminopyridine, 10 parts of potassium carbonate and 250 parts of water are stirred together at 95° for 10 hours. Thereupon, the reaction solution is stirred into 600 parts of hydrochloric acid (10% strength) at 90°. After cooling the resultant mixture to 30°, the precipitate which separates is filtered off with suction, washed with cold water, and triturated with such quantity of sodium carbonate as is necessary to convert the dyestuff acid into the sodium salt. The thus-obtained dyestuff, after drying, is an orange powder which corresponds to the formula

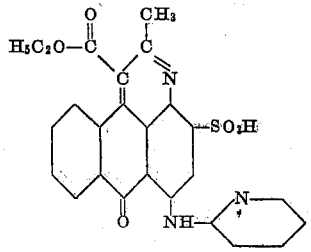

and dissolves in water with yellow-orange coloration. It dyes wool orange.

EXAMPLE 8

40 parts of 1 - carbethoxy - 2,4 - dimethyl - 6-bromo-aza(3)-benzanthrone, 10 parts of aminobenzene, 20 parts of anhydrous potassium acetate and 60 parts of hydroxybenzene are stirred together at 110° until a test specimen of the reaction mixture—taken up in ethyl alcohol, filtered and washed with hot water—is halogen-free. The reaction mass is then allowed to cool to 75°, 200 parts of ethyl alcohol are added dropwise, and the resultant precipitate suction-filtered off at 50°. The precipitate is washed with ethyl-alcohol until the wash water is only weakly colored, after which it is washed with hot water and then dried. The so-obtained dyestuff base consists of fine orange needles which melt at 185–186°.

14 parts of the thus-prepared base are stirred into 29 parts of sulfuric acid monohydrate. The resultant solution is heated to 40° until a test specimen, neutralized with sodium hydroxide, is completely soluble in water. Thereupon the reaction mass is stirred into 1000 parts of water, to which 200 parts of sodium chloride and 200 parts of aqueous sodium hydroxide solution (30% strength) have been added, and the resultant precipitate is then filtered off with suction. The precipitate is washed with aqueous sodium chloride solution (5% strength) and dried. The thus-obtained dyestuff dyes wool orange-yellow. It corresponds to the formula:

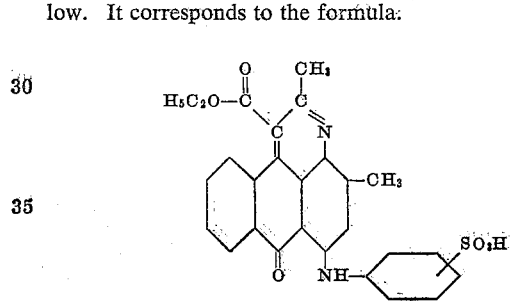

EXAMPLE 9

20.5 parts of 1-carbethoxy-2,4-dimethyl-6-bromo-aza-(3)-benzanthrone, 16 parts of 1-aminobenzene-4-sulfonic acid, 20 parts of potassium acetate, 50 parts of hydroxybenzene and 50 parts of water are stirred together at 110–115° until a test specimen is completely water-soluble. 100 parts of water and 210 parts of sodium chloride are then added to the reaction mass, the hydroxybenzene is distilled off with steam, the remaining mixture allowed to cool to 30°, and the resultant precipitate filtered off with suction. This precipitate is then washed with aqueous sodium chloride solution (2% strength) and dried. The product is a dyestuff with properties similar to that obtained according to Example 8. It corresponds to formula

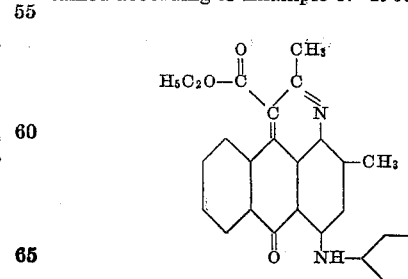

EXAMPLE 10

40 parts of 1-carbomethoxy-2,4-dimethyl-6-bromo-aza-(3)-benzanthrone, 22 parts of 2-amino-1,1'-diphenyl, 20 parts of anhydrous potassium acetate and 150 parts of n-butyl alcohol are stirred together at 120° until a test specimen—taken up in ethyl alcohol, filtered and washed with ethyl alcohol and hot water—is halogen-free. The reaction mixture is thereupon allowed to cool to room temperature (20–30°), and the formed precipitate is filtered off with suction. The precipitate is then washed with methylalcohol until the wash water is only slightly colored whereupon it is washed with water and then dried. The so-obtained dyestuff base dissolves with orange-yellow coloration in chlorobenzene.

44 parts of the dyestuff base are added, with stirring, to 240 parts of sulfuric acid monohydrate and the mixture is heated to 30–35° until a test specimen, neutralized with sodium hydroxide, is completely soluble in water. The solution is then poured into 2000 parts of water, the resultant precipitate is filtered off with suction, and washed with aqueous sodium chloride solution (2% strength) until the wash water runs neutral. The moist precipitate is triturated with a sufficient quantity of sodium carbonate to convert the dyestuff acid into the sodium salt, after which it is dried. The resultant dyestuff dyes wool orange. It corresponds to the formula

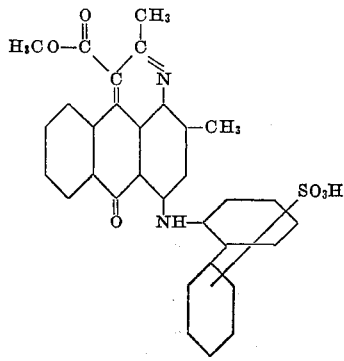

If, in the present example, the 40 parts of 1-carbomethoxy-2,4-dimethyl-6-bromo-aza(3)-benzanthrone are replaced by 41 parts of 1-carbethoxy-2,4-dimethyl-6-bromo-aza(3)-benzanthrone, and the 22 parts of 2-amino-1,1′-diphenyl are replaced by 22 parts of 4-amino-1,1′-azobenzene, and the procedure of the example otherwise adhered to, there is obtained a product which dyes wool in red shades.

EXAMPLE 11

41 parts of 1-carbethoxy-2,4-dimethyl-6-bromo-aza(3)-benzanthrone, 21 parts of 1-amino-3-nitrobenzene, 20 parts of anhydrous potassium acetate and 150 parts of nitrobenzene are stirred together at 120° until a test specimen—taken up in ethyl alcohol, filtered, and washed with ethyl alcohol and hot water—is halogen-free. The reaction mass is then allowed to cool to 30°, diluted with 50 parts of ethyl alcohol and the resultant crystalline precipitate filtered off with suction, washed with ethyl alcohol, then washed with hot water, and dried.

10 parts of the thus-prepared dyestuff bases are stirred into 22 parts of sulfuric acid monohydrate and 11 parts of fuming sulfuric acid (28%), and the mixture heated to 50–55° until a test specimen, neutralized with sodium hydroxide, is completely soluble in water. The solution is then stirred in 1000 parts of water and the resultant precipitate suction filtered off, washed with water until the wash water runs neutral, the moist precipitate triturated with sufficient sodium carbonate to convert the dyestuff acid into the sodium salt, and then dried. The thus-produced dyestuff dyes wool orange-yellow. It corresponds to the formula

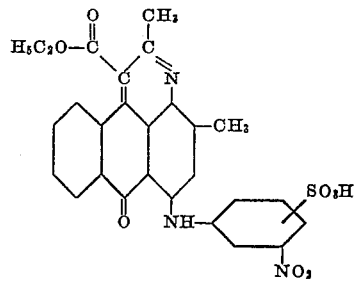

EXAMPLE 12

84 parts of 1-carbomethoxy-2,4-dimethyl-6-bromo-aza(3)-benzanthrone, 27 parts of 4,4′-diamino-1,1′-diphenyl-2,2′-sulfone, 40 parts of potassium acetate and 800 parts of n-butylalcohol are stirred together at 120° until a test specimen—taken up in ethylalcohol, filtered and washed with hot water—is halogen-free. The reaction mixture is then allowed to cool to 20°, and the resultant precipitate is filtered off with suction, washed with methyl alcohol and then with hot water, and dried. There is thus-obtained a red pigment which corresponds to the formula

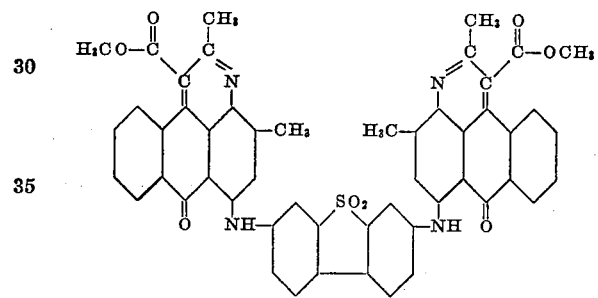

and which dissolves with orange-red coloration in nitrobenzene. The product can be easily brought into a state of fine sub-division by grinding with dispersing agents and can be used in this form for the dyeing of viscose in the spinning process and for pigment printing.

By replacing the 84 parts of 1-carbomethoxy-2,4-dimethyl-6-bromo-aza(3)-benzanthrone by 86 parts of the corresponding 1-carbethoxy derivative and replacing the 27 parts of 4,4′-diamino-1,1′-dipenyl-2,2′-sulfone by 25 parts of 4,4′-diamino-1,1′-diphenylsulfone and otherwise proceeding according to the preceding paragraph, a light brown powder is obtained which dissolves with yellow coloration in chlorobenzene.

EXAMPLE 13

12 parts of 1-carbethoxy-2-methyl-6-bromo-aza(3)-benzanthrone-4-sulfonic acid, 25 parts of the aminodiazo compound of the formula

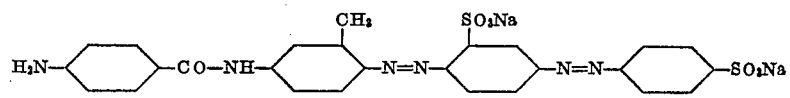

6 parts of sodium carbonate and 200 parts of water are stirred together for 24 hours at 90°. 20 parts of sodium chloride are then added to the reaction mass and the resultant precipitate is filtered off with suction. The precipitate is taken up in 1000 parts of water to which 50 parts of ethylalcohol have been added and the mixture is heated to 90° while stirring, then 200 parts of sodium chloride are added to the mixture and the resultant precipitate is filtered off with suction at 80°. The filter precipitate is then washed with aqueous sodium chloride solution with 10% strength after which it is dried. The dyestuff which corresponds to the formula

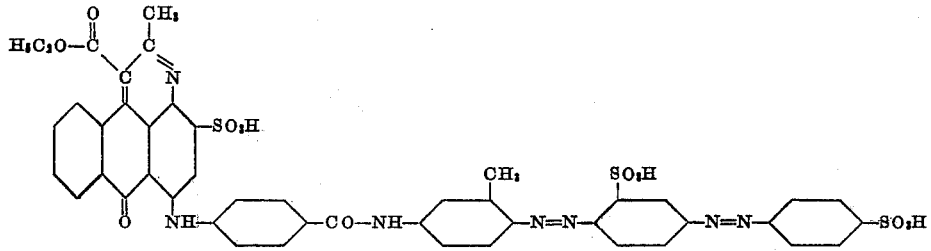

dissolves with red-orange coloration in water and dyes cotton orange from a bath containing sodium sulphate.

EXAMPLE 14

24 parts of 1-carbethoxy-2-methyl-4,6-dibromo-aza(3)-benzanthrone, 9 parts of 1-amino-4-acetylaminobenzene, 10 parts of potassium acetate and 150 parts of n-butylalcohol are stirred at 100° for 5 hours. 100 parts of ethylalcohol and 100 parts of water are then added to the mass and, after the latter has cooled to 45°, the formed precipitate is filtered off with suction. This precipitate is washed with ethylalcohol until the wash water runs colorless after which it is washed with water, and then dried.

10 parts of the so-obtained orange powder, 15 parts by volume of aqueous potassium sulfide solution of 50% strength and 30 parts of hydroxybenzene are heated together an an autoclave to 120° for 16 hours. Thereupon the hydroxybenzene is removed by steam distillation, the remaining solution filtered, the filtrate rendered alkaline with sodium carbonate at 95°, and 5 parts of sodium chloride added per 100 parts by volume of solution, while stirring. The resultant precipitate is filtered off with suction and washed with hot aqueous sodium chloride solution of 5% strength until the filtrate runs colorless and no longer has an alkaline reaction. Upon drying the precipitate, there is obtained a red dyestuff powder which corresponds to the formula

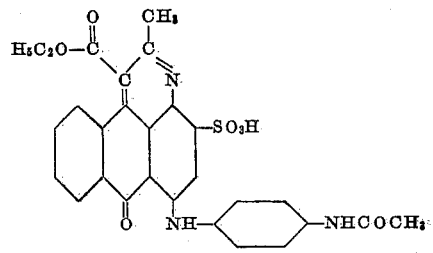

and dissolves with red coloration in water. It dyes wool red.

EXAMPLE 15

10 parts of 1-carbomethoxy-2,4-dimethyl-6-nitro-aza-(3)-benzanthrone, 5 parts of 1-amino-4-methoxybenzene, 10 parts of potassium acetate and 100 parts of n-butyl alcohol are heated to 100° for 20 hours, while stirring. The mixture is thereupon allowed to cool to 20° and the resultant precipitate is filtered off with suction, washed with methyl-alcohol until the wash water is only weakly colored, then washed with hot water, and dried. The so-obtained orange-red crystals correspond to the formula

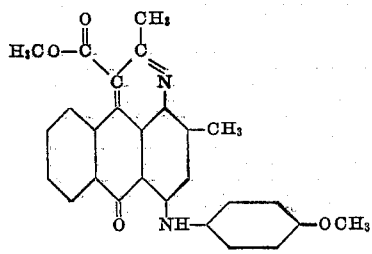

and melts at 193–196°. They dissolve in pure sulfuric acid with red coloration which, upon the addition of paraformaldehyde, turns toward the violet.

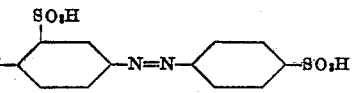

EXAMPLE 16

10 parts of 1-carbethoxy-2-methyl-6-bromo-aza(3)-benzanthrone, 5 parts of sodium acetate, 3 parts of 1,4-diaminobenzene and 100 parts of ethylalcohol are stirred together at 65° until a test specimen—taken up in water, filtered and washed with hot water—contains no more halogen. The reaction mass is then allowed to cool to room temperature (20–30°) and the resultant precipitate is filtered off with suction, washed with ethyl alcohol of 50% strength and then with water, after which it is dried. There is thus obtained a brown crystalline powder which corresponds to the formula

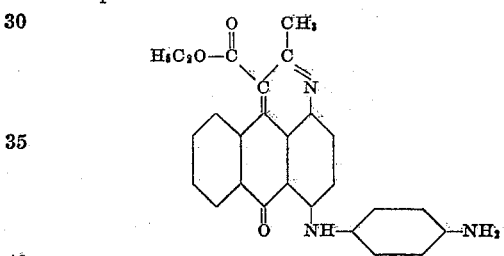

and dissolves with red coloration in hydrochloric acid of 10% strength.

EXAMPLE 17

19 parts of 1-carbethoxy-2,4-dimethyl-6-chloro-aza(3)-benzanthrone, 5 parts of 4,4'-diamino-1,1'-diphenyl, 20 parts of potassium acetate and 40 parts of hydroxybenzene are stirred together at 115° until a test specimen—taken up in ethylalcohol, filtered and washed with hot water—is halogen-free. The reaction mixture is then cooled to 75°, 150 parts of ethylalcohol are added, and the resultant precipitate is filtered off with suction at 20°. The precipitate is washed with ethylalcohol until the wash water runs colorless, after which it is washed with hot water, and is finally dried. There is thus obtained a brown-red powder which corresponds to the formula

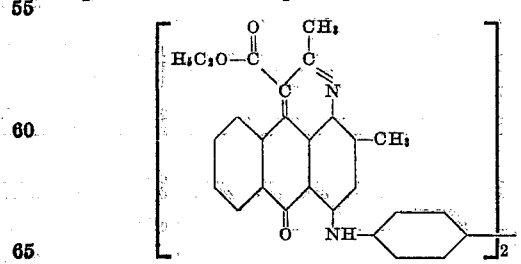

and which dissolves with orange-red coloration in chlorobenzene.

EXAMPLE 18

24 parts of 1-carbethoxy-2-methyl-6-bromo-aza(3)-benzanthrone-4-sulfonic acid, 5.5 parts of methylaminobenzene, 10 parts of sodium carbonate and 250 parts of water are stirred at 75–80° for 4 hours. The resultant precipitate is filtered off with suction at 20°, washed with aqueous sodium chloride solution of 10% strength until the filtrate (wash water) runs neutral, after which it is dried. The thus obtained dyestuff dissolves with red coloration in water and dyes wool Bordeaux red. It corresponds to the formula

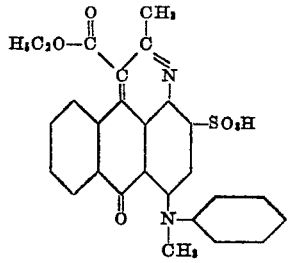

EXAMPLE 19

47 parts of 1-carbomethoxy-2-methyl-4,6-dibromo-aza-(3)-benzanthrone, 23 parts of 1-aminoanthraquinone, 12 parts of anhydrous potassium acetate, 200 parts of chlorobenzene and 0.3 part of copper powder are stirred together at 125° for 100 hours. The reaction mass is then allowed to cool and after diluting with chlorobenzene the resultant precipitate is filtered off with suction. The precipitate is washed with chlorobenzene, then with methylalcohol and thereupon with water, and is finally dried. The so-obtained pigment corresponds to the formula

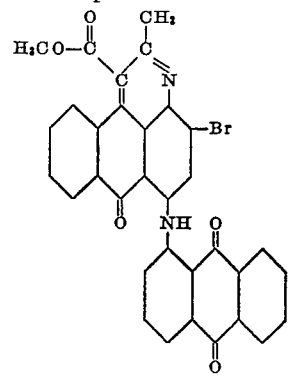

and dissolves with orange-red coloration in pyridine. Brought into fine sub-division with the aid of a dispersing agent, it can be used for coloring viscose in the spinning process and for pigment printing.

Further representative dyestuffs according to the present invention which can be prepared in manner analogous to the procedure set forth in the foregoing examples, are set forth in tabular form in the following

Table

| Example No. | Aza(3)-benzanthrone | Substitution Product of Ammonia | Color of Solution of Condensation Product |
|---|---|---|---|
| 20 | 1 - carbopropoxy - 2,4 - dimethyl - 6 - bromo-aza(3)-benzanthrone. | 1-amino-2,3-dimethylbenzene | orange in chlorobenzene. |
| 21 | do | 1-amino-2,4-diemthylbenzene | Do. |
| 22 | do | 1-amino-2,5-dimethylbenzene | Do. |
| 23 | do | 1-amino-3,4-dimethylbenzene | orange-yellow in chlorobenzene. |
| 24 | do | 1-amino-3,5-dimethylbenzene | orange in chlorobenzene. |
| 25 | 1 - carbomethoxy - 2,4- dimethyl -6 - bromo-aza(3)-benzanthrone. | 1-amino-2,6-dimethylbenzene | ornage-yellow in chlorobenzene. |
| 26 | do | 1-amino-2,4,6-trimethylbenzene | Do. |
| 27 | do | 1-amino-2-ethylbenzene | orange in chlorobenzene. |
| 28 | do | 1-amino-2-chlorobenzene | Do. |
| 29 | do | 1-amino-3-chlorobenzene | Do. |
| 30 | do | 1-amino-4-chlorobenzene | Do. |
| 31 | do | dehydrothiotoluidine | red in chlorobenzene. |
| 32 | 1 - carbethoxy - 2,4 - dimethyl - 6 - bromo-aza(3)-benzanthrone. | 1-amino-2-methylbenzene | orange in chlorobenzene. |
| 33 | do | 1-amino-3-methylbenzene | Do. |
| 34 | do | 1-amino-4-methybenzene | Do. |
| 35 | do | 1-amino-2-methoxybenzene | Do. |
| 36 | do | 1-amino-2-methoxy-5-methylbenzene | Do. |
| 37 | do | 1-amino-4-phenoxybenzene | Do. |
| 38 | do | 1-amino-4-(4'-chloro)-phenoxybenzene | Do. |
| 39 | do | 1-amino-4-phenylbenzene | Do. |
| 40 | do | 1-aminonapthalene | Do. |
| 41 | do | 2-aminonapthalene | Do. |
| 42 | 1 - carbomethoxy - 2 - methyl - 4,6 -dibromo-aza(3)-benzanthrone. | 1-amino-6-chloroanthraquinone | red in nitrobenzene. |
| 43 | do | 1-amino-7-chloroanthraquinone | Do. |
| 44 | do | 1-amino-6,7-dichloroanthraquinone | Do. |
| 45 | do | 1-amino-5,6,7,8-tetrahydronaphthalene | orange in chlorobenzene. |
| 46 | do | 2-amino-5,6,7,8-tetrahydronaphthalene | Do. |
| 47 | do | methylamine | orange-yellow in chlorobenzene. |
| 48 | do | octylamine | Do. |
| 49 | 1 - carbethoxy - 2,4 - dimethyl - 6 - bromo-aza(3)-benzanthrone. | dimethylamine | orange in chlorobenzene. |
| 50 | do | ethylaminobenzene | red in chlorobenzene. |
| 51 | do | acetylaminobenzene | yellow-orange in chlorobenzene. |
| 52 | do | butyrylaminobenzene | Do. |
| 53 | do | benzoylaminobenzene | Do. |
| 54 | do | 4'-methylbenzoylaminobenzene | Do. |
| 55 | do | 3'-chlorobenzoylaminobenzene | Do. |
| 56 | 1 - carbethoxy - 2 - methyl - 6 - bromo - aza - (3)-benzanthrone-4-sulfonic acid. | 1-aminobenzene-2-carboxylic acid | red in water. |
| 57 | do | 1-aminobenzene-3-carboxylic acid | Do. |
| 58 | do | 1-aminobenzene-4-carboxylic acid | Do. |
| 59 | do | 4,4'-diaminostilbene-2,2'-disulfonic acid | Do. |
| 60 | do | dehydrothiotoluidine-sulfonic acid | Do. |
| 61 | do | 4'-(4''-amino)-benzoylamino-1,1'-azobenzene-3-carboxylic acid | orange in water. |

Table.—Continued

| Example No. | Aza(3)-benzanthrone | Substitution Product of Ammonia | Color of Solution of Condensation Product |
|---|---|---|---|
| 62 | do | 4-hydroxy-4'-(4''-amino)-benzoylamino-1,1'-azobenzene-3-carboxylic acid | Do. |
| 63 | do | $H_2N-\langle\rangle-N=N-\langle\underset{CH_3}{\rangle}-\langle\rangle-CO-NH-\langle\underset{SO_3H}{\overset{OH\ COOH}{\rangle}}$ | red in water. |
| 64 | do | $H_2N-\langle\underset{SO_3H}{\rangle}-CH=CH-\langle\underset{HO_3S}{\rangle}-N\underset{N=C\atop CH_3}{\overset{OH\atop C=C-N=N-\langle\rangle-SO_3H}{}}\phantom{x}COOH$ | Do. |
| 65 | do | 2-amino-5-hydroxy-6-(2'-carboxybenzene-1')-azonaphthalene-7,4'-disulfonic acid. | Do. |
| 66 | 1-carbomethoxy-2,4-dimethyl-6-bromo-aza(3)-benzanthrone. | ethanolamine | orange-yellow in chlorobenzene. |

EXAMPLE 67

21 parts of 1-amino-2-phenoxy-4-(4'-methyl)-phenylamino-anthraquinone, 40 parts of acetoacetic acid ethyl ester, 40 parts of chlorobenzene and 3 parts of 1-methylbenzene-4-sulfonic acid are heated to 115° while stirring. Readily-volatile reaction products are removed from the reaction zone by entrainment in a gentle stream of air passed over the reaction vessel. The temperature is gradually raised to 125°. As soon as a test specimen of the reaction mixture turns yellow in benzene and there is no further change in this color, the mixture is allowed to cool to 80°, 150 parts of ethyl alcohol are added in the course of 20 minutes, and the mixture allowed to cool further to 20°. The resultant base which crystallizes out is separated by suction filtration, and then washed with ethyl alcohol until the wash-liquid runs weakly yellow in color, after which it is washed with water and then dried. The base is an orange powder which dissolves with yellow-orange coloration in benzene.

10 parts of the base are introduced at 0° into a mixture of 75 parts of sulfuric acid monohydrate and 25 parts of fuming sulfuric acid of 28% strength. As soon as a test specimen of the reaction mixture, after neutralization of the specimen with sodium hydroxide, has become completely water-soluble, the reaction mass is introduced into 500 parts of an aqueous sodium chloride solution of 25% strength, the temperature rising to 50°. After cooling back to 20°, the precipitate is suction-filtered off and washed neutral with aqueous sodium chloride solution of 25% strength. The moist filter cake is pasted up with sodium carbonate and is then dried. There is thus obtained a dyestuff in the form of a brown powder which dissolves with orange coloration in water and dyes wool orange from an acid bath.

EXAMPLE 68

25 parts of 1-amino-2-(4'-tert.-amyl)-phenoxy-4-phenylamino-anthraquinone, 40 parts of acetoacetic acid ethyl ester, 40 parts of chlorobenzene and 3 parts of 1-methylbenzene-4-sulfonic acid are heated to 130° while stirring, a gentle stream of air being passed over the reaction mixture to remove easily-volatile reaction products. The temperature of 130° is maintained until a test specimen of the reaction mixture turns orange-yellow in benzene and there is no further change in this color. After cooling the reaction mixture to 80°, 150 parts of ethyl alcohol are then added in the course of 30 minutes, after which the mixture is allowed to cool down to 20°. The formed precipitate is filtered off with suction and washed with ethyl alcohol until the wash-liquid runs only weakly yellow in color, after which the washing is completed with water. The resultant base is, in dry form, an orange powder which dissolves with orange-yellow coloration in benzene.

10 parts of the said base are introduced at 0° into a mixture of 75 parts of sulfuric acid monohydrate and 25 parts of fuming sulfuric acid of 28% strength, the mixture being stirred at 0–3° until a test specimen thereof, after neutraliaztion with sodium hydroxide, is completely soluble in water. The reaction solution is then introduced into 500 parts of aqueous sodium chloride solution of 10% strength and then filtered off with suction. The precipitate is washed with 10% aqueous sodium chloride solution and then taken up in 500 parts of water, warmed to 90°. 3 parts of sodium carbonate are added and the dyestuff is precipitated at 95° by the gradual addition of 100 parts of sodium chloride. The crystalline precipitate is filtered off with suction while hot and is washed with hot 20% aqueous sodium chloride solution until the wash-liquid runs off colorless. The thus-obtained dyestuff is, in the dry state, an orange crystalline powder and dissolves with orange-yellow coloration in water. It dyes wool orange-yellow from an acid bath.

EXAMPLE 69

If, instead of 21 parts of 1-amino-2-phenoxy-4-(4'-methyl)-phenylamino-anthraquinone, there are used in Example 67, 18 parts of 1-amino-2-methoxy-4-(4'-methyl)-phenylamino-anthraquinone or 19 parts of 1-amino-2-propoxy-4-(4'-methyl)-phenylamino-anthraquinone, similar dyestuffs are obtained, dissolving with orange coloration in water and dyeing wool orange from acid baths.

EXAMPLE 70

A dye-bath is prepared from 1 part of the dyestuff according to Example 1, 6000 parts of distilled water, 10 parts of anhydrous sodium sulfate and 1.5 parts of acetic acid (100%), and 100 parts of wool are entered at 50–60°. The bath is heated to boiling in the course of 30 minutes. After boiling for a half hour, 1.5 parts of acetic acid (100%) are again added to the bath and boiling continued for an additional half hour. The dyed material is then withdrawn from the bath, washed and dried.

The other hereinbefore-disclosed dyestuffs may be used for dyeing in essentially similar manner.

EXAMPLE 71

100 parts of an aqueous paste (of 20% strength) of the pigment dye prepared according to Example 19 are added to 22,500 parts of an aqueous viscose solution of 9% strength in a mixer. The thus-colored spinning mass is stirred for 15 minutes, then deaerated, and thereupon subjected to conventional spinning and desulfurizing processes. The other pigment dyes of the invention may be similarly employed.

Having thus disclosed the invention what is claimed is:

1. A process for the manufacture of a compound of the aza(3)-benzanthrone series which comprises condensing, in the presence of an acid-binding agent and in the absence of a copper catalyst, an aza(3)-benzanthrone which corresponds to the formula

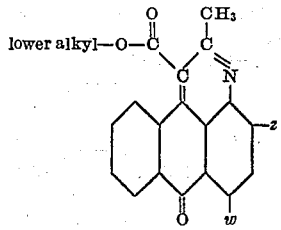

wherein z stands for a member selected from the group consisting of hydrogen, chlorine, bromine, methyl and $SO_3H$, and w stands for a member selected from the group consisting of chlorine, bromine and nitro, with an amine corresponding to the formula

wherein $R_1$ stands for a member selected from the group consisting of hydrogen, alkyl and acyl, and $R_2$ stands for a member selected from the group consisting of hydrogen, alkyl, cycloalkyl, aryl, mononuclear aralkyl and mononuclear heterocyclic radicals.

2. The process for the manufacture of a compound of the aza(3)-benzanthrone series which comprises condensing 1 - carbethoxy - 2 - methyl - 6 - bromo - aza(3) - benzanthrone-4-sulfonic acid with ammonia in the presence of an acid-binding agent and in the absence of a copper catalyst.

3. The process for the manufacture of a compound of the aza(3)-benzanthrone series which comprises condensing 1 - carbethoxy - 2,4 - dimethyl - 6 - bromo - aza(3) - benzanthrone with amylamine in the presence of an acid-binding agent and in the absence of a copper catalyst.

4. The process for the manufacture of a compound of the aza(3)-benzanthrone series which comprises condensing 1 - carbethoxy - 2,4 - dimethyl - 6 - bromo - aza(3)-benzanthrone with 1-aminobenzene-4-sulfonic acid in the presence of an acid-binding agent and in the absence of a copper catalyst.

5. The process for the manufacture of a compound of the aza(3)-benzanthrone series which comprises condensing 1 - carbethoxy - 2 - methyl - 4,6 - dibromo - aza(3)-benzanthrone with 1-amino-4-acetylaminobenzene in the presence of an acid-binding agent and in the absence of a copper catalyst.

6. The process for the manufacture of a compound of the aza(3)-benzanthrone series which comprises condensing 1 - carbethoxy - 2 - methyl - 4,6 - dibromo - aza(3)-benzanthrone with 1-aminoanthraquinone in the presence of an acid-binding agent and in the absence of a copper catalyst.

7. A dye of the aza(3)-benzanthrone series which corresponds to the formula

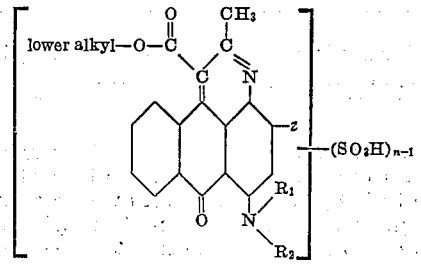

wherein z stands for a member selected from the group consisting of hydrogen, chlorine, bromine, methyl, lower alkoxy, mononuclear aryloxy and $SO_3H$, $R_1$ stands for a member selected from the group consisting of hydrogen, alkyl and acyl, $R_2$ stands for a member selected from the group consisting of hydrogen, alkyl, cycloalkyl, aryl, mononuclear aralkyl and mononuclear heterocyclic radicals, and n is one of the integers 1, 2, 3 and 4.

8. The compound of the formula

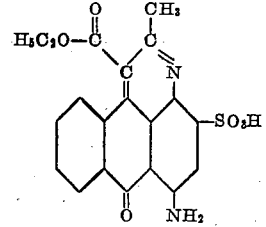

9. The compound of the formula

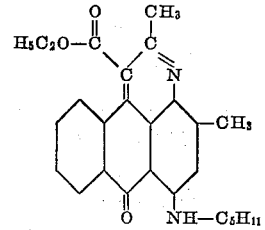

10. The compound of the formula

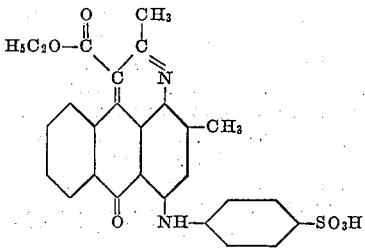

11. The compound of the formula

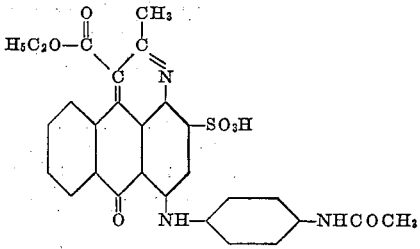

12. The compound of the formula

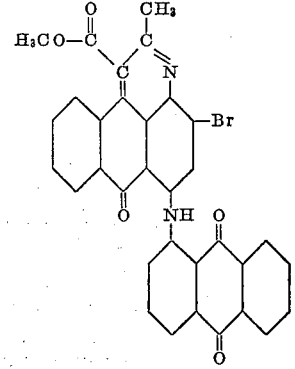

References Cited in the file of this patent
FOREIGN PATENTS
185,548    Germany _____ June 26, 1906
OTHER REFERENCES
Allen et al.: J. Am. Chem. Soc., vol. 72, pp. 585–588 (1950).